(12) United States Patent
Austin

(10) Patent No.: US 9,589,212 B2
(45) Date of Patent: Mar. 7, 2017

(54) METHODS AND SYSTEMS FOR RECORDING AND RECALLING EVENTS

(75) Inventor: James Austin, Driffield (GB)

(73) Assignee: Cybula Ltd., York (GB)

( * ) Notice: Subject to any disclaimer, the term of this patent is extended or adjusted under 35 U.S.C. 154(b) by 1008 days.

(21) Appl. No.: 13/518,464

(22) PCT Filed: Dec. 22, 2010

(86) PCT No.: PCT/GB2010/052197
§ 371 (c)(1),
(2), (4) Date: Sep. 10, 2012

(87) PCT Pub. No.: WO2011/077161
PCT Pub. Date: Jun. 30, 2011

(65) Prior Publication Data
US 2012/0330618 A1    Dec. 27, 2012

(30) Foreign Application Priority Data
Dec. 22, 2009   (GB) .................................. 0922317.3

(51) Int. Cl.
*G06K 9/62* (2006.01)
*G06K 9/00* (2006.01)

(52) U.S. Cl.
CPC ....... *G06K 9/6276* (2013.01); *G06K 9/00785* (2013.01); *G06K 9/6284* (2013.01)

(58) Field of Classification Search
CPC ....................................................... G06F 17/16
USPC ............................................................ 702/189
See application file for complete search history.

(56) References Cited

PUBLICATIONS

Weeks et al. (Improved AURA k-Nearest Neighbour Approach, IWANN 2003, LNCS 2687, pp. 663-670, 2003).*
Hodge et al. (A Binary Neural k-Nearest Neighbour Technique, Knowledge and Information Systems, pp. 276-292, 2005).*

* cited by examiner

*Primary Examiner* — Manuel L Barbee
*Assistant Examiner* — Raymond Nimox
(74) *Attorney, Agent, or Firm* — Barnes & Thornburg LLP

(57) ABSTRACT

To record events, a vector A is taken of n measurements An. Each measurement An is converted into a binary vector Bn using a binning process. Measurements in vector Bn, are transformed using a kernel operation, to make a vector Cn. All vectors Cn are concatenated into a single vector D. A binary vector M is created with P bits set. A date and vector A are recorded against vector M in a database Z. Vector D is associated into a correlation matrix memory R against vector M. To recall events, the above steps are repeated up to concatenating all vectors Cn into single vector D. Vector D is then used to access a correlation matrix memory R to recall an association vector S, and vector S is applied directly or indirectly to database Z to recover the or each date associated with vector S. This may facilitate the monitoring of assets such as generators, gas turbines, motors, and larger assets such as trains, boats and planes, to ensure that they continue to operate reliably.

12 Claims, 4 Drawing Sheets

Transitions in a two-dimensional state space

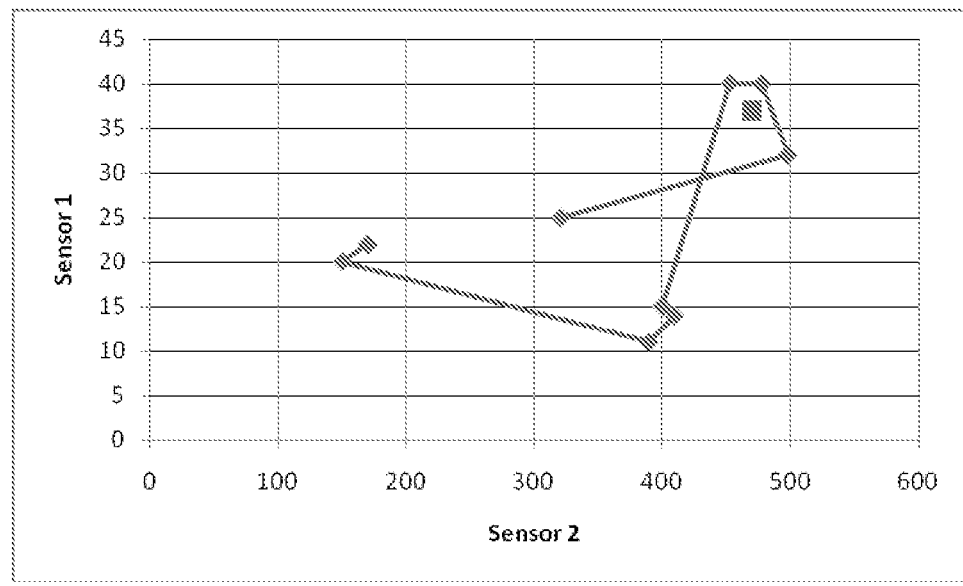
Figure 1 : Transitions in a two-dimensional state space
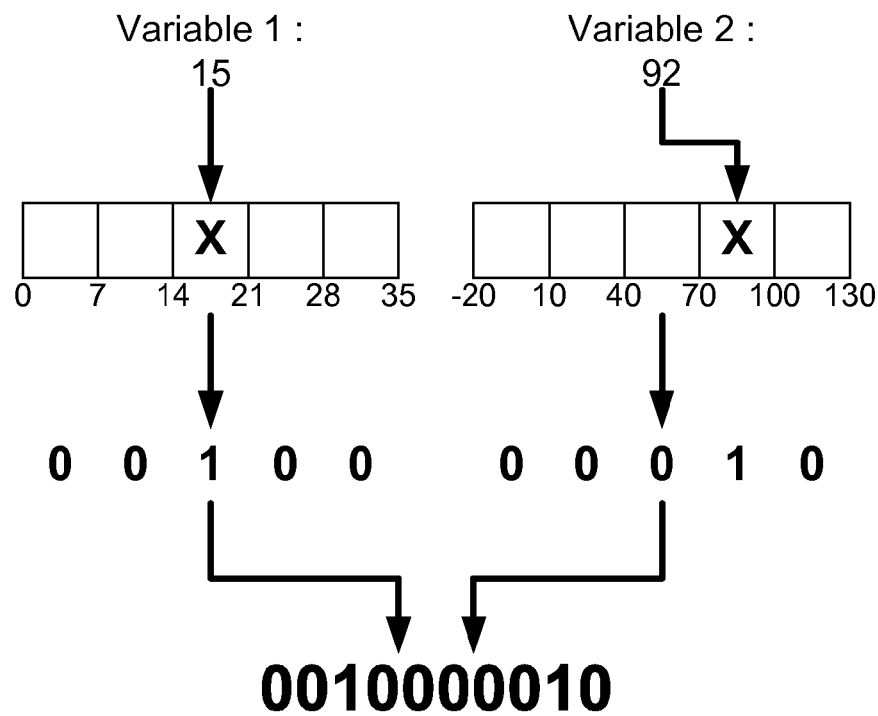
Figure 2 : Converting a state set into a binary pattern

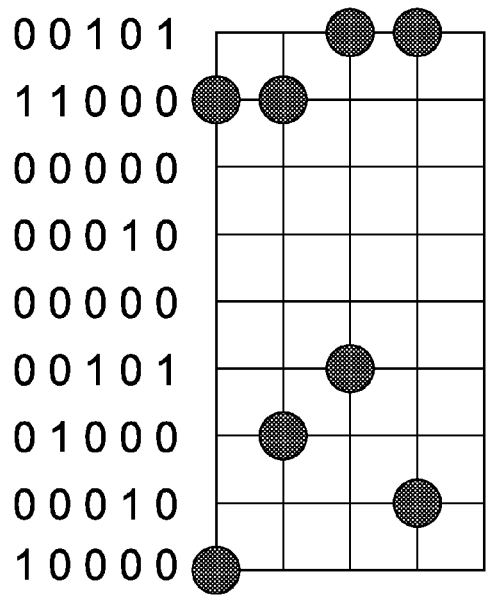
Figure 3 : A binary CMM after 5 states have been stored
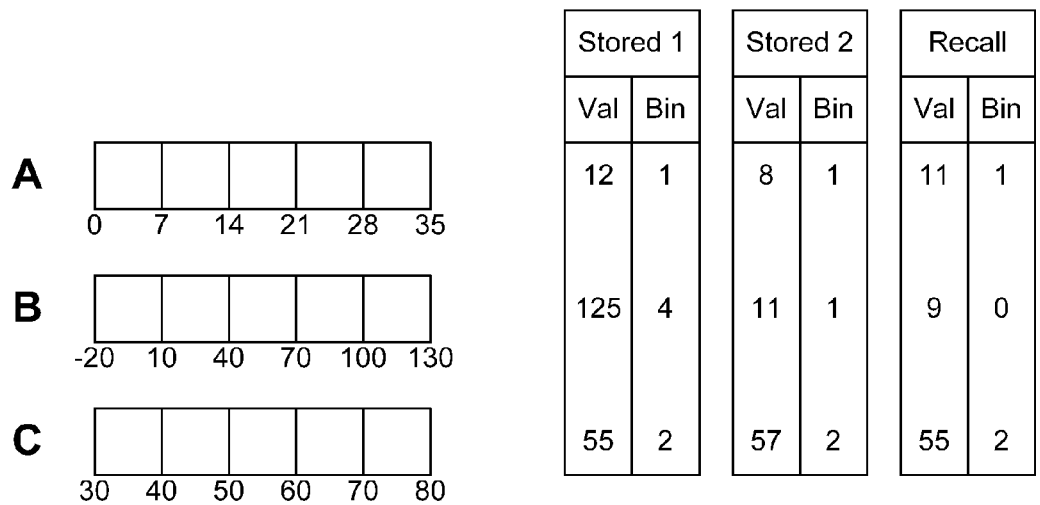
Figure 4 : Stored 1, Stored 2 and Recall Vectors and Bin Sets A, B and C

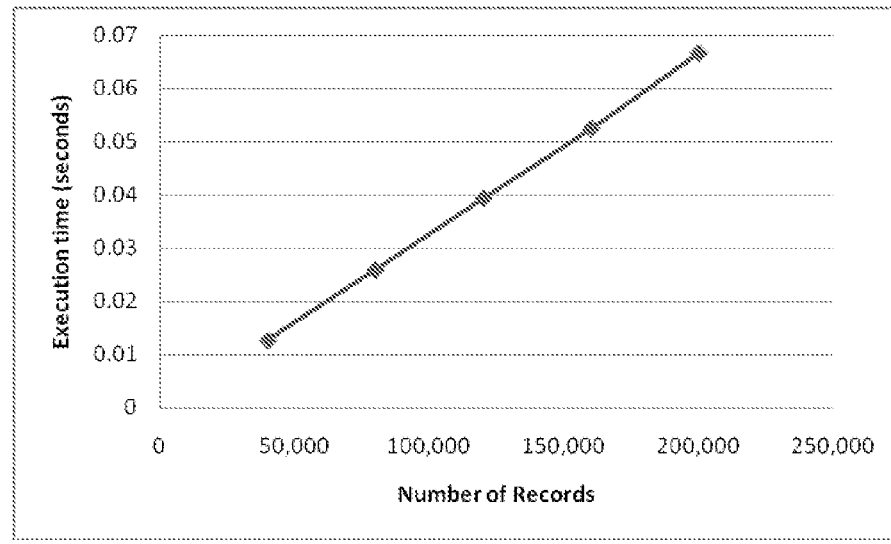
Figure 5 : The time taken to compare one record to different numbers of stored records
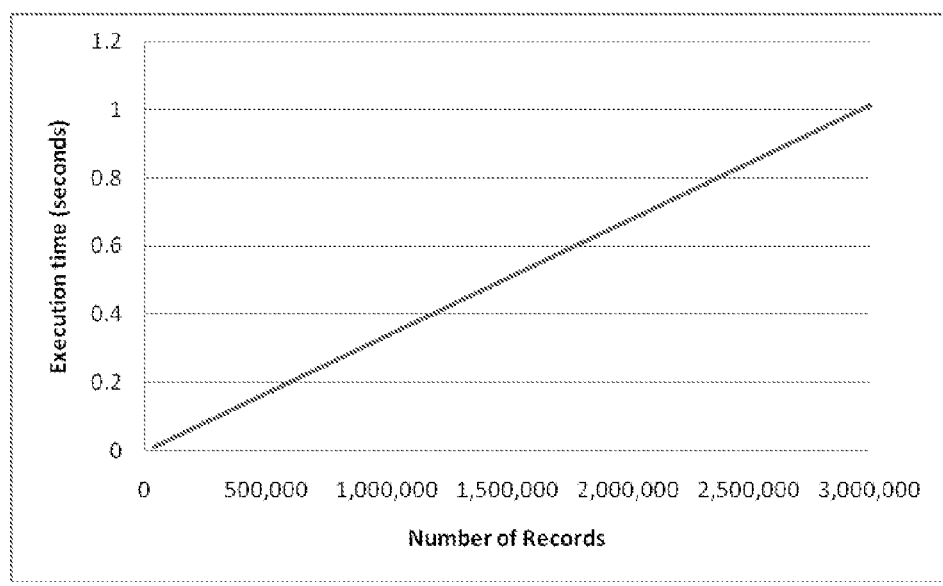
Figure 6 : Extrapolation of data from Figure 5 to show the approximate number of stored records that can be compared to the current state in one second

METHODS AND SYSTEMS FOR RECORDING AND RECALLING EVENTS

This invention relates to methods and systems for recording and recalling events and is concerned particularly although not exclusively with asset monitoring.

Asset monitoring is the task of monitoring assets such as (for example) generators, gas turbines, motors, etc. and larger assets such as trains, boats and planes, etc. to ensure that they continue to operate reliably. Embodiments of the present invention may serve to record correct operation and using, this record, to detect incorrect operation.

Embodiments of the present invention build on and extend the work in AURA KNN [1,2] which is a fast implementation of pattern matching using a Correlation Matrix Memory based associative memory (CMM), utilising technology heavily researched at the University of York. AURA is a collection of methods based on CMMs for pattern recognition on large and complex datasets.

According to one aspect of the present invention, there is provided a method of recording events, comprising the steps of:

taking a vector A of n measurements, where $A_n$ is one of the measurements;

converting each of the measurements $A_n$ into a binary vector $B_n$ using a binning process;

transforming the measurements in vector $B_n$, using a kernel operation, to make a vector $C_n$;

concatenating all of the vectors G into a single vector D;

creating a binary vector M that has P bits set;

recording a date and vector A against vector M in a database Z; and associating vector D into a correlation matrix memory R against vector M.

In another aspect, the invention provides a method of recalling events, comprising the steps of:

taking a vector A of n measurements, where $A_n$ is one of the measurements;

converting each of the measurements $A_n$ into a binary vector $B_n$ using a binning process;

transforming the measurements in vector $B_n$, using a kernel operation, to make a vector $C_n$;

concatenating all of the vectors $C_n$ into a single vector D;

using vector D to access a correlation matrix memory R to recall an association vector S; and applying vector S directly or indirectly to a database Z to recover the or each date associated with vector S.

Such a method may include the further step of performing a back check between recovered vectors A' and input A to check similarity, where recovered vectors A' match with T in the database Z.

Said thresholding step may use a method selected from the group comprising the L-max method, the Willshaw method and the fixed threshold method.

Said step of applying vector S to database Z may include the steps of thresholding vector S to a binary vector T and looking up vector T within database Z to recover the or each date associated with vector T.

Both a date and a time may be recorded against vector M in database Z.

Said kernel operation may be a parabolic kernel operation.

Said measurements may be derived from traffic data.

Said traffic data may include loop flow readings and/or bus timings.

Said measurements may be derived from engineering asset performance data.

Said concatenation step may superimpose all vectors $C_n$ into single vector D.

Said concatenation step may add all vectors $C_n$ into single vector D.

Said step of converting each of measurements $A_n$ into a binary vector $B_n$ may be an identity operation. That is, a null operation is performed on $A_n$ to obtain $B_n$ Prior to associating vector D into correlation matrix memory R against vector M, vector D may be used to access the correlation matrix memory R to recall an association vector S and, if vector S exists in the database, the database record associated with S is updated with a new date and/or time, if S does not exist, D is associated into correlation matrix memory R against vector M.

In the step of associating vector D into correlation matrix memory R against vector M, new columns may be added in the correlation matrix memory R.

The invention extends to a system for recording or recalling events, adapted to perform a method according to any of the preceding aspects of the invention.

For a better understanding of the invention, and to show how embodiments of the same may be carried into effect, reference will now be made, by way of example, to the accompanying diagrammatic drawings, in which:

FIG. 1 is a graph to illustrate transitions in a two-dimensional state space;

FIG. 2 illustrates schematically the conversion of a state set into a binary pattern;

FIG. 3 illustrates schematically a binary correlation matrix memory (CMM) after 5 states have been stored;

FIG. 4 illustrates schematically distances between a Recall vector and vectors Stored 1 and Stored 2, with reference to Bin Sets A, B and C;

FIG. 5 is a graph to illustrate the time taken to compare one record to different numbers of stored records; and FIG. 6 is a graph extrapolated from that of FIG. 5 to show the approximate number of stored records that can be compared to a current state in one second;

Figure 7:
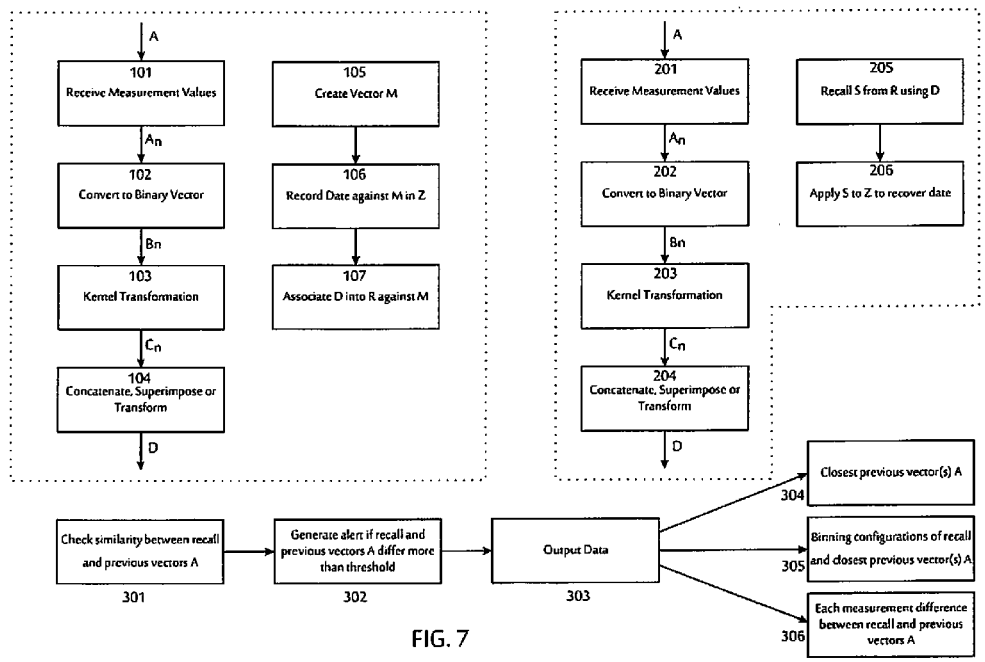
FIG. 7 is a flowchart to illustrate steps of a method in accordance with the invention.

In examples of the invention, in order to record events, a vector A is taken of n measurements, where $A_n$ is one of the measurements. Each of the measurements $A_n$ is converted into a binary vector $B_n$ using a binning process. The measurements in vector $B_n$, are transformed using a kernel operation, to make a vector $C_n$. All of the vectors $C_n$ are concatenated into a single vector D. A binary vector M is created that has P bits set. A date and vector A are recorded against vector M in a database Z. Vector D is associated into a correlation matrix memory R against vector M. In order to recall events, the above-mentioned steps are repeated, up to the stage of concatenating all of the vectors $C_n$ into single vector D. Vector D is then used to access a correlation matrix memory R to recall an association vector S, and vector S is applied directly or indirectly to database Z to recover the or each date associated with vector S. Applying vector S to database Z may include thresholding vector S to a binary vector T and looking up vector T within database Z to recover the or each date associated with vector T.

A key element of asset monitoring is the early detection of potential faults in the asset, allowing preventative action to be taken before major damage occurs. An asset monitoring system has to identify these potential faults based on the values of a large number of variables, which can either be direct sensor readings or calculated values derived from these. Depending on the potential fault that is occurring, there may be different clues in the data that allow the problem to be identified. The clues that are available can take one of three different forms and each provides different challenges to the asset monitoring system and requires a different approach.

1) The easiest faults to identify just require the thresholding of individual parameters. If a sensor reading or derived value exceeds a set threshold value, it is known that a certain problem has occurred. Alternatively, there may be a value range which is expected during normal operation and any readings not within this range may indicate abnormal activity.
2) Some faults may only be detectable by identifying coincident patterns or value shifts amongst multiple variables, with no individual parameter departing from its expected operational range. There are many pattern recognition techniques that can be applied in these scenarios, including an example tool such as SDE Task Planner, but all require either example data from previous occurrences of these faults or a degree of expert knowledge in the system.
3) A more challenging category of fault to detect relates to those problems that have not been foreseen during the asset development, have not happened before and do not involve any one variable departing from its normal operating range. The pattern recognition techniques used for type 2 cannot be applied, as there are no examples of the fault to provide training data. Therefore, to detect such faults, the asset monitoring system must store a representation of normal behaviour and issue warnings when the asset's activity deviates from this behaviour.

The detection system discussed here is called 'AURA Alert' and focuses on this third scenario, although it would be possible to develop the system so that it can also be used to identify known faults. AURA Alert is provided with data from an extended period of time during which the asset has been known to perform correctly. At regular time intervals during this period, the values of a representative set of variables from the data are converted into a binary pattern, which represents the state of the asset at that time instance. This binary pattern is then stored in a Correlation Matrix Memory (CMM, an associative memory). Then, during asset operation, the current state of the asset can be compared to the stored normal operating behaviour to see if that combination of variable values has been seen previously. If the combination has not been seen before, this could be indicative of a problem, even if no individual variables have deviated from their normal value range.

State Transitions

At any period in time, an asset with N sensors can be considered to be in a particular state within an N-dimensional space. This can be most easily depicted in two dimensions as shown in the graph in FIG. 1. The values from the two sensors point to a unique position within the graph and these are recorded as dots within the state space, whilst the lines linking the dots show how the state of the asset moves around over time. During learning, all the locations within the state space that are visited by the asset, during a period of normal asset activity, are recorded.

During a recall operation, the current values of the two variables will also correspond to a point within the state space, as shown by a square in FIG. 1. If this square is on top of one of the stored dots, then the asset is currently in a state that has been seen before during normal behaviour. However, if the square is not on top of any of the previously stored states/dots (as illustrated in FIG. 1), the system is behaving differently from before and the greater the distance from the stored state/dot, the more unusual the current state.

Further information can also be obtained from the proposed asset monitoring system. Firstly, it can work out how often the asset has been in the current state, by studying the number of stored states that are close to the recalled point. Also, by labelling the stored states with information about the asset at the time, further information can be obtained about when the asset was last in this state. For example, a previously seen fault could be stored and labelled as an error state, providing a solution to the second of the fault detection categories discussed earlier.

Although this system can be depicted most easily in two dimensions, most asset monitoring systems will need to store the values of many more than two sensor readings. When a third variable is added, the state of the system will move around in a cubic space and beyond this, N dimensions will create an N-dimensional hyperrectangle, in which the asset states will lie. Although this is harder to visualise, the system works in exactly the same way, with the locations of historical asset states recorded and then compared to the current state.

The idea that has been suggested so far is a nearest neighbour classifier, which could theoretically be implemented by storing the raw values of each variable at each time interval and comparing the recalled points to each of these. However, the resultant time complexity of performing these separate comparisons severely limits the number of states that can be stored in the system. However, by storing the states in a CMM, millions of states can be stored and the comparisons still performed very quickly [1]. This is the central point of interest.

Converting a Set of Variables into a Binary Pattern

In order to store an asset state, a set (or vector) of variable values, $A_n$ of n, must be first converted into a binary pattern (or vector), $B_n$, which can be inserted into a CMM. This requires a binning process, with each potential value for each variable assigned to a bin and each bin corresponding to a different bit that will be set in the binary pattern. This process is depicted in FIG. 2.

The number of bins required for each variable and how the values are assigned to the bins are important operational parameters that significantly affect the behaviour of the system. The simplest binning method is to use bins of equal width, as shown in FIG. 2, with the full range of potential values split evenly between the bins available. For example, if a variable can take values from 0 to 100 and there are 10 bins available, values between 0 and 10 will be assigned to the first bin, 10 and 20 to the second bin and so on.

One problem with an even width binning system is that the full variable range may only be used in unusual circumstances, stretching each bin unnecessarily and causing detail to be lost where it is required. For example, a temperature sensor may record values of between 200 and 220 degrees when a machine is operational, but only 20 degrees when it is switched off. Using even width bins over the full range of temperature values will therefore result in the majority of values being assigned to the same few bins.

One possible solution to this problem is to use the bins to cover only the smaller, important range of values and either discard the time instances where the value does not fall within this range, or place them in the outer bins. Alternatively, fixed frequency binning can be used, where the range of each bin is scaled so that there is an even number of time instances placed in each bin. This will automatically increase the sensitivity of the binning system in the regions of the state space that are most densely populated. Whether this is advantageous will depend on whether it is small changes in the populated regions, or larger changes in the less frequented areas, which are more indicative of a change in the behaviour of the system. Further discussion of the selection of optimal binning strategies can be found below.

Another design issue that must be considered is that the full range of values a variable can take may be unknown when the asset monitoring system is set up. In such instances, training data can be used to set upper and lower bounds of a binning range, but there may still be instances of values encountered during recall that have not been seen during training. Such an occurrence may be significant enough to flag a potential error without even considering the other variable states. However, if the state is to be presented to AURA Alert regardless, these values can either be placed in the most extreme bin or an extra bin added to each end of the variable for 'out of range' values. One design, from work on AURA KNN, suggests that a threshold is set for the number of values that can be placed in the extra bins and, once this is exceeded, the bins values are reset and the memory retrained.

Once each variable from a state has been assigned to a bin, the binary pattern representing that state can be created by concatenating the binary patterns together to create an input vector D. The number of bits in the pattern for each variable is equal to the number of bins assigned to that variable and there is a one to one relationship between each bin and its corresponding bit. The pattern for that variable will have only the bit set that corresponds to the appropriate bin. Note that adjacent bits must correspond to adjacent bins as this will help with recalling similar matches when an exact match cannot be found. Once all the variables have been converted to binary patterns, these can be concatenated to create a binary representation of the entire state.

Storing Binary Patterns

Using the above method for the conversion of the asset state at each time interval to a binary pattern, a period of normal asset behaviour can be stored in a CMM. Each unique binary state is stored in a separate column of the CMM. Therefore, before the pattern is added to the CMM, it is presented to the memory and a Willshaw threshold of N applied (where the threshold to convert the outputs from real values to binary values is set to N, and N is the 'weight' of the binary input pattern—i.e. the count of the number of bits set to one in the input pattern). If the output pattern has positive weight, the input pattern has been previously added to the memory and does not need to be added again. However, if the output pattern has zero weight, the input pattern is stored in the next available column of the CMM. An example of a CMM after 5 patterns have been presented can be seen in FIG. 3. As two of the patterns are identical, only four columns have been added to the CMM.

During recall, once the closest matches to an input have been found, a back checking stage can be used to more accurately calculate the distance between a current point and a stored point and to provide the user with information about the novel state, if one has been found. In order to do this, a connection must be created between the column number of a state and the original data A, by holding the information in a database Z. This connection can also be used to provide the user with information about the current state of the asset, the date and time the input measurements were taken, or a particular label that has been attached to the state: for example "Running mode A". It could also be used to store the frequency with which that state was encountered during training.

Searching the CMM

Once a representative period of historical, normal behaviour has been stored in the CMM, the memory can be used to test whether the current state of the asset has been seen previously. The current state is converted into a binary pattern via the same method used in the training phase. If the binary pattern is presented to the memory and a Willshaw threshold of N applied, where N is the weight of the pattern, the output pattern will have a weight of one only if the current asset state has been seen previously during normal asset behaviour. However, if the output pattern has a weight of zero, the current asset state has not been previously seen and the system will have to evaluate the extent of the distance between the current state and the previous asset behaviour.

By dropping the Willshaw threshold by X, it is possible to relax the matching process in the memory and search for any occurrences of the pattern where all but X of the variables belong to the same bin. However, this measure of similarity takes no account of the extent of the difference of the X variables that do not belong in the same bin. For example, when comparing the recall pattern to the two stored patterns shown in FIG. 4, both will match two bins (A and C) out of three (A, B and C), but the remaining value of stored pattern 2 belongs to the adjacent bin, whilst the remaining value of stored pattern 1 has been placed in a distant bin. Stored pattern 2 is therefore much closer to the recalled pattern, but both would be recalled by the same Willshaw threshold.

Weighting the Inputs

To generate a more accurate representation of the distance between the current and recorded asset states, the CMM scores can be used to apply weights to the bins, according to their distance from the current values. Instead of generating a binary pattern that represents the bin in which the value of that variable is placed, a vector of scores is created, which defines a kernel that quantifies the distance of each bin from the value. For example, if there were 10 bins for a variable and the value was assigned to the third bin, the score vector below could be used, which would generate a triangular shaped kernel around the recall value.

3, 4, 5, 4, 3, 2, 1, 0, 0, 0

If this scoring system were applied to the example above, the recall vector would return a score of 11 for stored state 1, whereas stored state 2 would return a score of 14. Consequently, the scoring system now more accurately reflects the actual distance between each stored point and the recalled vector.

A detailed discussion of various kernels that can be used to provide different approximations of distance can be found in [2]. However, the kernel defined by the equation below, which approximates to the Euclidean distance between the two points (if fixed width binning has been used), has been shown to provide the best results in testing so far. The equation below gives the value for bin number k ($bins_{fk}$), where the value of that variable has been assigned to bin t ($bins_{ft}$), max(n) is the maximum number of bins for any variable and $n_f^2$ is the number of bins for this variable.

$$Parabolic_{bins_{fk}} = \left[\left(\frac{\max(n)}{2}\right)^2 - (bins_{ft} - bins_{fk})^2 \frac{\max(n)^2}{n_f^2}\right]$$

If this kernel were applied to a set of 10 bins, where the maximum number of bins for any variable was 10 and the value was assigned to the third bin, the following score vector would be used:

21, 24, 25, 24, 21, 16, 9, 0, 0, 0

Instead of the binary vector, the score vector, calculated from the chosen kernel, is presented to the CMM and a new threshold is required to generate the output pattern. To return only an exact match, a Willshaw threshold of N*S can be used, where N is the number of variables and S is the maximum score for one variable. This can then be slightly decreased to permit matches where some of the values are not assigned to the correct bin, but are assigned to one nearby. An alternative strategy is to use an L-max threshold of 1, to find the stored state that best matches the current machine state. The score associated with the most closely matching column can then be used to determine how different the current state is to any that have been seen before, to provide a measure of the seriousness of the potential problem with the asset—the lower the score, the greater the level of the alert that will be transmitted to the user.

In a current system, a threshold (T) between 0 and 1 is calculated during an evaluation stage and a state is classed as a novelty if there are no states returned when a Willshaw threshold of T*M is applied, where M is the maximum possible score. Once a novelty has been detected, an L-max threshold of 1 is applied (where L-max selects the L highest values in the real valued output vector, and these are set to one, the rest to zero) to find the closest matching states stored in the memory and these are passed to a back checking stage.

Back Checking

By adding a system of back checks, where the original data from the closest matching states are compared to the recalled state, the system is able to more accurately calculate the distance between the points and provide a more informative output to the user, relating to the nature and extent of the differences. Currently, each time a novelty is detected, AURA Alert reports the closest scores found, the maximum score that could have been achieved, the binning configuration of the recalled state and closest matches and the variables that were found to differ. The variables that differ from the closest matching state can then be flagged in a graphical display (e.g. Cybula's SDE product) to provide a visual representation of the novelties detected.

If a link is provided between each column number and the raw data, AURA Alert can be used as a filter to reduce a large number of stored states to a more manageable quantity of closer matches [2]. The L-max threshold is increased to X and the system will locate the nearest X matching patterns, which can then be searched using a more computationally expensive search algorithm to more accurately locate the closest matches.

Optimisation

AURA Alert contains several tuneable parameters that can be adjusted to control the behaviour of the system. These can either be decided according to expert knowledge of the asset, or set automatically based on the data, or set to a fixed value regardless of the data to simplify the setup of the asset monitoring system. Values can be set up automatically by using the evaluation dataset to perform a parameter sweep or genetic algorithm.

Variable selection—The variables that will be monitored by the system. This is the most intuitive of the parameters and can probably be decided fairly effectively by the end user.

Threshold—the percentage of the maximum score which the highest score for a state must exceed, if that state is not to be considered a novelty. This is currently set automatically during the evaluation stage.

Number of bins—Various suggestions and investigations into the optimal number of bins can be found in [1], including 10, 2 log N and 149.

Bin start and end points—these can be the lowest and highest values found in the training data. Expert knowledge could be used to adjust these to more suitable values, especially if the user only wanted to monitor the system when it was operational, because non-operational values can differ greatly from those found when the asset is running.

Fixed Width or Fixed Density binning—There are advantages and disadvantages of these systems. Fixed width binning is currently used, as this has been found to provide a more reliable performance.

Kernel—Parabolic, Triangular and Rectangular shaped kernels have been tried and implemented and are also discussed in [2]. A Parabolic shaped kernel is currently used which approximates the Euclidean distance between the states.

Scalability

It has been shown that AURA KNN, the CMM implementation of the underlying pattern recognition method (k nearest neighbour, k-NN), is more scalable than traditional methods. However, in order to be useful for real time asset monitoring, the recall process for each asset state must be completed within a reasonable time period. Ideally, if we were to search for the asset state every minute, the search should be completed within 60 seconds to allow the next search to commence.

The paper by Hodge and Austin [1] shows how the execution time of the AURA KNN algorithm is affected when the number of stored points is increased and the trends are extrapolated to show a prediction of how execution times will grow as this is increased further. Even though AURA KNN is much more efficient than traditional methods, the predicted growth from [1] is still shown to near $O(n^2)$. However, the times recorded in [1] assume that every state must be compared to every other state, whereas in AURA Alert, it is only the time of one recall that is important.

If we take the raw data and divide the execution times by the number of data points, we get an approximation of the time required to recall one data point and, if these are plotted, a near linear relationship is discovered, as shown in FIGS. 5 and 6. By extrapolating this line, we can estimate that AURA Alert can compare one state to 180 million other states within one minute. This is the equivalent to storing the state of one asset every minute for 342 years. FIG. 5 shows recall times for an original five data points and FIG. 6 shows this extrapolated to illustrate how many records can be searched within one second.

It should be noted that this is a very rough estimate, because variable and bin numbers will vary from application to application, processing speeds will increase over time. However, this does suggest that processing times will not be a problem, even if long periods of data from multiple assets are stored in the CMM at a resolution of 1 point per minute.

Implementation

Methods as illustrated and as described above may typically be carried out by systems implemented by computers programmed to perform the method steps, or processors specifically constructed to perform the method steps. Technical effects and advantages of such methods include recording correct operation and detecting incorrect operation of assets, to ensure that the assets continue to operate reliably.

Embodiments of the present invention may be employed with advantage in monitoring performance of engineering assets and monitoring traffic data including loop flow readings and bus timings.

FIG. 7 illustrates a processor based method of monitoring operation of an asset of which measurement values of operating parameters are taken over time, the method comprising a first part of recording events, a second part of recalling events, and a third part of performing a back check.

In the first part, in step 101, a vector A of n measurement values is received, where $A_n$ is one of the measurement values. In step 102, each of the measurement values $A_n$ is converted into a binary vector $B_n$ using a binning process. In step 103, each of the vectors $B_n$, is transformed using a kernel operation, into a vector $C_n$. In step 104, all of the vectors $C_n$ are concatenated, superimposed or added into a single vector D.

In step 105, there is created a binary vector M that has P bits set. In step 106, a date vector is recorded against vector M in a database Z. In step 107, vector D is associated into a correlation matrix memory R against vector M.

In the second part, steps 201 to 204 correspond to steps 101 to 104 respectively. In step 205, vector D is used to access the correlation matrix memory R to recall an association vector S. In step 206, vector S is applied directly or indirectly to the database Z to recover a date associated with vector S.

In the third part, in step 301, similarity is checked between a recall vector A and a previously recorded vector A. In step 302, an alert signal is generated when a measurement value of recall vector A differs from the corresponding measurement value of previously recorded vector A by an amount greater than a predetermined threshold value. In step 303, data is output to indicate at least one of:

(304) one or more previously recorded vector A that is closest to the recall vector A;

(305) the binning configurations of the recall vector A and one or more previously recorded vector A that is closest to the recall vector A; and (306) each measurement value that was found to differ between the recall vector A and a previously recorded vector A.

REFERENCES

[1] Victoria J. Hodge & Jim Austin. A Binary Neural k-Nearest Neighbour Technique. Knowledge and Information Systems, 8(3): pp. 276-292, Springer-Verlag London Ltd, 2005

[2] Michael Weeks, Vicky Hodge, Simon O'Keefe, Jim Austin & Ken Lees. Improved AURA k-Nearest Neighbor Approach. In, Proceedings of IWANN-2003, International Work-conference on Artificial and Natural Neural Networks, Mahon, Menorca, Balearic Islands, Spain. Jun. 3-6, 2003. Lecture Notes in Computer Science (LNCS) 2687, Springer Verlag, Berlin.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A processor based method of detecting, in real time, incorrect operation of an engineering asset of which measurement values of operating parameters are taken over time, the method comprising, sequentially, a first part of recording events, a second part of recalling events, and a third part of performing a back check, wherein:

each of said first and second parts comprises the steps of:
receiving a vector A of n measurement values, where $A_n$ is one of the measurement values;
converting each of the measurement values $A_n$ into a binary vector $B_n$ using a binning process; and
concatenating, superimposing or adding all of the vectors $B_n$ into a single vector D;
one of said first and second parts comprises the additional step of transforming each of the vectors $B_n$, using a kernel operation, into a vector $C_n$, all of the vectors $C_n$ then being concatenated, superimposed or added into the single vector D;
said first part comprises the further steps of:
creating a binary vector M that has P bits set;
recording a date vector against vector M in a database Z; and
associating vector D into a correlation matrix memory R against vector M;
said second part further comprises the steps of:
using vector D to access the correlation matrix memory R to recall an association vector S; and
applying vector S to the database Z to recover a date associated with vector S; and
said third part comprises the steps of:
checking similarity between a recall vector A' and a previously recorded vector A;
generating an alert signal that indicates incorrect operation of the engineering asset in real time when a measurement value of recall vector A' differs from the corresponding measurement value of previously recorded vector A by an amount greater than a predetermined threshold value; and
outputting data to indicate at least one of:
one or more previously recorded vector A that is closest to the recall vector A';
the binning configurations of the recall vector A' and one or more previously recorded vector A that is closest to the recall vector A'; and
each measurement value that was found to differ between the recall vector A' and a previously recorded vector A.

2. A method according to claim 1, wherein said third part includes a thresholding step that uses said predetermined threshold value and uses a method selected from the group comprising the L-max method, the Willshaw method and a fixed threshold method.

3. A method according to claim 1, wherein said step of applying vector S to database Z includes the steps of thresholding vector S to a binary vector T and looking up vector T within database Z to recover each date associated with vector T.

4. A method according to claim 1, wherein both a date and a time are recorded against vector M in database Z.

5. A method according to claim 1, wherein said kernel operation is a parabolic kernel operation.

6. A method according to claim 1, wherein said measurements are derived from traffic data.

7. A method according to claim 6, wherein said traffic data includes loop flow readings and/or bus timings.

8. A method according to claim 1, wherein all vectors $C_n$ are superimposed into single vector D.

9. A method according to claim 1, wherein all vectors $C_n$ are added into single vector D.

10. A method according to claim 1 wherein, prior to associating vector D into correlation matrix memory R against vector M, vector D is used to access the correlation matrix memory R to recall an association vector S and, if vector S exists in the database, the database record associated with S is updated with a new date and/or time and, if S does not exist, D is associated into correlation matrix memory R against vector M.

11. A method according to claim 1 wherein, in the step of associating vector D into correlation matrix memory R against vector M, new columns are added in the correlation matrix memory R.

12. A system for detecting in real time incorrect operation of an engineering asset of which measurement values of operating parameters are taken over time, the system being adapted to perform a method according to claim 1.

* * * * *